Figure 1:
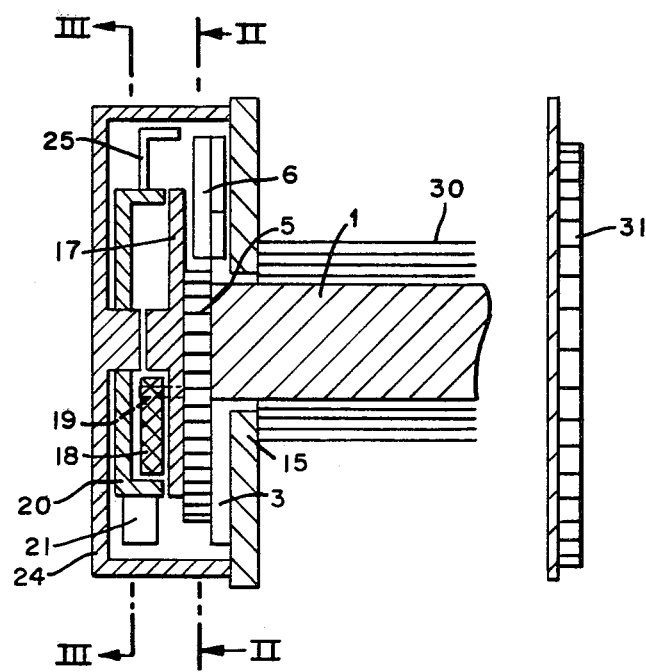

United States Patent [19]

Adomeit

[11] 4,355,772
[45] Oct. 26, 1982

[54] FAST ACTING AUTOMATIC SEAT BELT RETRACTOR

[75] Inventor: Heinz-Dieter Adomeit, Berlin, Fed. Rep. of Germany

[73] Assignee: N.V. Klippan S.A., Heverlee-Leuven, Belgium

[21] Appl. No.: 253,768

[22] PCT Filed: Jun. 21, 1979

[86] PCT No.: PCT/DE79/00060

§ 371 Date: Oct. 19, 1979

§ 102(e) Date: Oct. 19, 1979

[87] PCT Pub. No.: WO80/02823

PCT Pub. Date: Dec. 24, 1980

[51] Int. Cl.³ .................. A62B 35/02; B65H 75/48
[52] U.S. Cl. .................. 242/107.4 A; 242/107.4 B
[58] Field of Search .................. 242/107.4 A, 107.4 B; 280/806; 297/478, 480

[56] References Cited

U.S. PATENT DOCUMENTS

| | | | |
|---|---|---|---|
| 3,058,687 | 10/1962 | Bentley | 242/107.4 B |
| 3,880,381 | 4/1975 | Peel | 242/107.4 A |
| 3,999,722 | 12/1976 | Weman et al. | 242/107.4 A |
| 4,059,242 | 11/1977 | Tanaka | 242/107.4 A |
| 4,066,223 | 1/1978 | Takada | 242/107.4 A |
| 4,083,512 | 4/1978 | Rumpf | 242/107.4 A |
| 4,090,678 | 5/1978 | Yamanashi | 242/107.4 A |
| 4,162,773 | 7/1979 | Wallin | 242/107.4 A |
| 4,167,254 | 9/1979 | Paitula et al. | 242/107.4 A |
| 4,187,995 | 2/1980 | Rex | 242/107.4 A |
| 4,190,213 | 2/1980 | Ueda | 242/107.4 A |

FOREIGN PATENT DOCUMENTS 2258199 8/1975 France .
2346028 10/1977 France .

Primary Examiner—John M. Jillions
Attorney, Agent, or Firm—Roger H. Criss

[57] ABSTRACT

The invention relates to a rapid acting automatic belt arresting means. A housing (10) for a vehicle inertia sensor is integral with a control part (3) which is mounted pivotably on belt shaft (1). When pawl (11) is moved, either by the inertia sensor or a belt sensitive mechanism (18, 21), to engage a locking gear (5) connected to shaft (1), further rotation of the shaft (1) pivots control part (3) which thereby moves a locking pawl (6) into locking engagement with locking gear (5) preventing further belt withdrawal.

10 Claims, 3 Drawing Figures

FAST ACTING AUTOMATIC SEAT BELT RETRACTOR

The invention relates to a rapid acting automatic belt arresting means with a main housing, a rewind shaft with an associated rewind spring and a wound belt, as well as a locking mechanism consisting of an inertia sensor, a moveably mounted locking element, a locking gear and a control part for engaging the locking element with the locking gear, and a rotational inertia for actuating the locking element upon excessive belt acceleration.

A device of the aforementioned type is known from German Pat. No. 23 49 613. In this rapid acting automatic belt arresting means the housing which receives the inertia sensor is mounted at the main housing. During an excessive vehicle delay the movement which is exerted by the inertia sensor must be received by a scanning device and transmitted to an auxilliary element, so that the locking element is caused by the auxiliary element to come into engagement with the locking gear for locking the belt movement. Thereby it was shown that essential movement cycles have to be taken into consideration until the locking element engages the locking gear. These movement cycles require a certain time wherein the belt is unwound from the belt automatically without interference. This means that before arresting the belt automatically an additional loose belt portion is provided whereby the body of the retained person is accelerated forwardly.

It is therefore an object of the invention to improve the known rapid acting automatic belt arresting means in such a manner that immediately after operating the inertia sensor an arresting of the locking gear is initiated without any time delay.

This object of the invention is obtained in that the housing of the inertia sensor is a unitary means with the control part, and that the inertia mass is directly coupled with the inertia sensor housing.

The invention obtains in an advantageous manner that each movement of the inertia sensor from its rest position directly causes a movement of the control part through which the engagement of the locking element with the locking gear is immediately initiated without activating auxilliary elements first. Due to the direct coupling of the rotational inertia with the inertia housing, an immediate initiation of the locking of the locking gear by the locking element takes place automatically during an exaggerated belt acceleration. This means, that after each activation of the rapid acting automatic belt arresting means caused either because of an exaggerated vehicle delay or an exaggerated belt acceleration an immediate locking of the locking gear by the locking element is initiated. Thereby only a very small rotation of the rewinding shaft is the result from activation of the inertia sensor to the engaging of the locking element in the locking gear. Also, due to the coupling of the inertia sensor housing with the inertia mass a forced synchronization of the locking is present after the belt acceleration. The elimination of an auxiliary element permits a very low construction width of the rapid acting automatic belt arresting means, which permits an easier installation for example in the door supports and the like. In view of the fact that the inertia sensor does not have to actuate an auxilliary element any longer through the provided sensor pawl, but that the reaction movement of the sensor housing is directly received from the control part, the sensor pawl which is in engagement with the inertia sensor may be constructed for lower loads.

Figure 2:
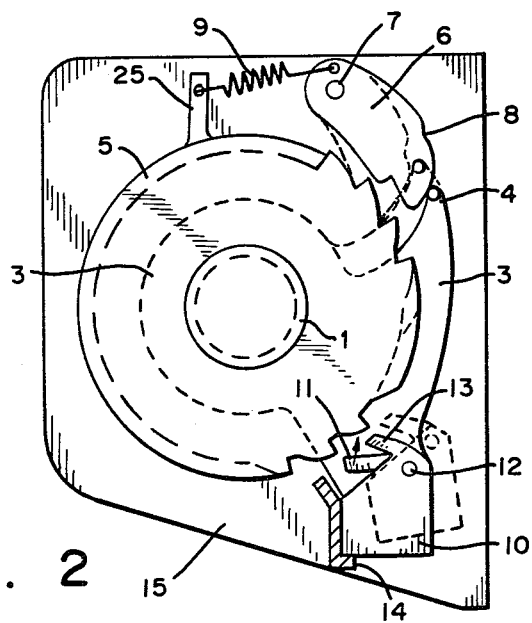
Figure 3:
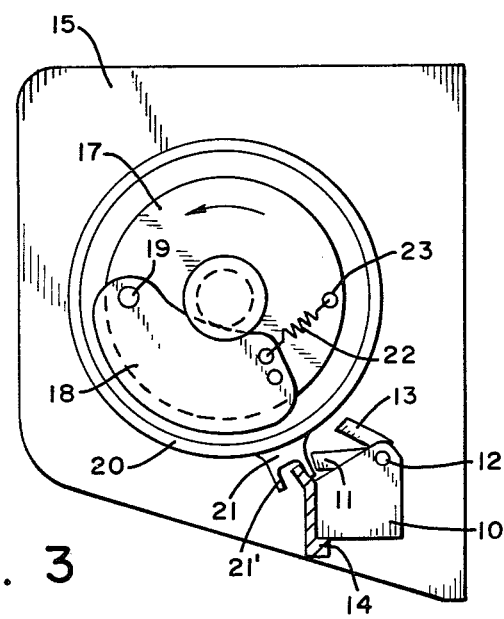

In the following one embodiment of the invention is described and shown in the drawing. The drawing shows:

FIG. 1 a longitudinal sectional view through one side of a rapid acting automatic belt arresting means wherein the locking gear, as well as the locking element and the inertia sensor, as well as the rotational inertia mass for actuating the locking element during exaggerated acceleration are mounted, FIG. 2 is a side view along line II—II of FIG. 1, and;

FIG. 3 a further side view along line III—III of FIG. 1.

A rewinding shaft 1 is rotatably mounted in a main housing 15 of the rapid acting automatic belt arresting means which is a unitary piece with locking gear 5. On its circumference the locking gear 5 is provided with teeth. A locking element 6 is pivotably mounted at 7 in main housing 15. With its free end locking element 6 can engage the teeth of locking gear 5. In the shown embodiment a control part 3 is mounted concentrically with respect to the rewinding shaft 1, whereby the control part is disposed between the locking gear 5 and housing 15. End 4 of the control part 3 which is disposed adjacent to locking element 6 is shaped as a thrust shoulder which is in engagement with a cam on locking element 6. In accordance with FIGS. 2 and 3 the end of the control part which is away from thrust shoulder 4 is shaped as a unitary piece with housing 10 of the inertia sensor. A freely moveable ball is provided in this housing. A pawl 11 is pivotably mounted at 12 on the inertia sensor housing which is in engagement with the sensor ball. An abutment 14 is provided in main housing 15 against which the inertia sensor housing 10 engages in the rest position. In this rest position and with the sensor ball at rest pawl 11 is away from the adjacent teeth of the locking gear. An abutment 13 for a stroke limitation of the pawl 11 is provided on housing 10. Seat belt webbing 30 is wrapped about shaft 1 and the shaft is biased towards the rewind direction by rewind spring 31 attached to on end of shaft 1.

During an exaggerated vehicle delay or vehicle acceleration the sensor ball of the inertia sensor comes into engagement with pawl 11 within housing 10 and pivots the pawl out of the rest position. Thereupon, the end of the pawl 11 engages a tooth of the adjacent locking gear 5. Thereby, the control part 3 together with the sensor housing 10 is moved from the rest position since at this moment the locking gear 5 is rotated even by a slight amount, due to a forced belt movement. Since the control part 3 is mounted opposite the main housing 15, the thrust shoulder 4 immediately engages the locking element 6 with the locking gear 5 during the start of the control part movement. At the end of the cam on the outer side of the locking element a notch 8 is provided for relieving the movement of pawl 11, whereby the thrust shoulder 4 of control part 3 engages the notch at the end of the movement. Due to this engagement of thrust shoulder 4 into notch 8 the control part 3 and thereby the sensor housing 10 in FIG. 2, can perform a movement counterclockwise, whereby pawl 11 is pivoted out of engagement with the tooth of the locking gear 5 for relieving the pawl. The position of control part 3 and therefore the unitary coupled inertia sensor housing as well as the position of the locking element 6 in an arresting position is indicated partly in dotted lines.

The end of the locking element 6 which is opposite the locking end is coupled with a pulling spring 9 with which the the effect of the locking element 6 is held out of engagement with the locking gear 5. The pivot movement of the locking element 6 which is initiated by the pulling spring also pushes the control part 3 over the thrust shoulder 4 into a rest position wherein the unitary control part 3 with sensor housing 10 engages abutment 14. In this position pawl 11 is ready for a transmission of the movement of the sensor ball within the sensor housing 10.

In accordance with FIG. 1 a support plate 17 is mounted on the outer side of the locking gear 5. In accordance with FIG. 3, a brake shoe 18 which is an inertia mass is mounted on a pin 19 on the support plate 17. This brake shoe 18 is encompassed by a brake drum 20 which is rotatable with respect to a cover cap 24. The cover cap 24 is fixedly coupled with main housing 15. One end of pulling spring 22 is mounted on brake shoe 18 and the other end on support plate 17. Brake shoe 18 can be pivoted out of position against the effect of pulling spring 22 when moving the support plate and thereby during the movement of the rewinding shaft 1 for engaging brake drum 20. The deflection of the brake shoe occurs during an exaggerated belt acceleration and thereby an exaggerated angle acceleration of rewind shaft 1. In accordance with FIG. 3 a cam 21 is mounted on the outer side of the brake drum 20 which is in engagement with abutment 14. Simultaneously, cam 21 is coupled with sensor housing 10 and pawl 11. In a rotating movement of the brake drum 20 due to an engagement by the brake shoe 18 the cam 21 and thereby the pawl 11 of the sensor housing is moved. Thereby, in the same manner as during the deflection of pawl 11 by the sensor ball the control part 3 is moved for an engagement of the locking element 6 with locking gear 5. The cam shoulder 21 is provided with an abutment 21' which comes into engagement with housing abutment 14 at a point when pawl 11 engages with one tooth of the locking gear during a movement of brake drum 20. This assures that the brake drum 20 executes only a low movement required for an engagement of the pawl with the locking gear. A finger 25 is mounted on the circumference of the brake drum 20 at which the aforementioned pulling spring of the locking element is attached. By the effect of the pulling spring 9 not only the locking element and thereby the control part 3 are pulled into the rest position, but also the brake drum is brought into its starting position, wherein the cam shoulder 21 engages on the abutment 14. The brake shoe 18 together the locking gear 5 and the coupled support plate can rotate within the brake drum, as long as the belt is not unwound with an exaggerated acceleration. For this purpose, the brake shoe 18 is held out of engagement with the brake drum by means of spring 22. An exaggerated belt acceleration overcomes the force of the spring 22, so that the brake shoe 18 engages brake drum 20, so that the drum can be moved away from abutment 14 by means of its cam 21, so that the pawl 11 of the sensor housing 10 engages with one tooth of the locking gear 5.

I claim:

1. A rapid locking automatic seat belt retractor comprising a main housing, a shaft rotatably mounted in the housing with a seat belt wound thereon, a rewind spring for the shaft, a locking mechanism comprising a vehicle inertia sensor, a movably mounted locking element, a locking gear connected to said shaft for rotation therewith and a control member for engaging the locking element with the locking gear to lock the retractor, and a rotational shaft acceleration sensing means capable of actuating the locking element to engage the locking gear upon excessive belt acceleration characterized in that:

the control member comprises a pivotable plate (3) mounted about shaft (1), the plate (3) having a portion (4) directly engageable with the locking element (6) to move the locking element (6) to engage the locking gear (5);

a housing (10) for the inertia sensor, said housing being integral with said plate (3) and a pawl (11) provided on the housing (10), and means rotatable with said shaft and engageable by said pawl, whereby when said pawl (11) is moved by said inertia sensor to engage said rotatable means further unwinding rotation of said shaft (1) pivots said pawl (11), housing (10) and integral plate (3) to cause locking element (6) to engage locking gear (5) thereby locking the shaft;

and wherein the locking element (6) and locking gear (5) are mounted on the exterior of main housing (15), the portion (4) of plate (3) acting to directly pivot locking element (6) upon pivoting of plate (3); and the rotational acceleration sensing means (18,20) actuates pivoting movement of plate (3) upon excessive belt acceleration to lock the retractor.

2. The retractor of claim 1 wherein the rotational acceleration sensing means (18,20) includes a portion (21) which is engageable with pawl (11) to move pawl (11) into engagement with said rotatable means.

3. The retractor of claim 2 wherein said rotatable means comprises said locking gear.

4. The retractor of claim 1 including means for releasing the pawl (11) from engagement with said rotatable means when the locking element (6) is engaged with the locking gear (5).

5. The retractor of claim 1 wherein the gear (5) which is engaged by the pawl (11) is rotatable during extraction of the belt in the same direction as the pivoting direction of the plate (3).

6. The retractor of claim 1 wherein portion (4) of plate (3) engages a cam on locking element (6) and a notch (8) is provided at the end of said cam in order to relieve the load on the sensor housing (10) at the termination of the locking action.

7. The retractor of claim 1 wherein plate (3) is mounted concentrically with shaft (1).

8. The retractor of claim 1 wherein said rotational acceleration sensing means comprises a brake drum (20) and a brake shoe (18) which acts as a flywheel mass and is engageable with said brake drum, said brake shoe being pivotably mounted on a support plate (17) that is rigidly connected to locking gear (5).

9. The retractor of claim 8 including a cam shoulder (21) on the outer circumference of brake drum (20), said cam shoulder being engageable with said pawl, and an abutment (14) on said main housing for limiting movement of said sensor housing.

10. The retractor of claim 8 including a spring (22) disposed between said brake shoe and support plate whereby said brake shoe is held away from said brake drum in the rest position.

* * * * *